（12）United States Patent
Kobayashi et al.

(10) Patent No.: US 9,180,976 B2
(45) Date of Patent: Nov. 10, 2015

(54) ELECTRIC PROPULSION SYSTEM CONTROL APPARATUS

(71) Applicant: JAPAN AEROSPACE EXPLORATION AGENCY, Chofu-shi, Tokyo (JP)

(72) Inventors: Hiroshi Kobayashi, Chofu (JP); Akira Nishizawa, Chofu (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 0 days.

(21) Appl. No.: 14/193,161

(22) Filed: Feb. 28, 2014

(65) Prior Publication Data
US 2014/0257599 A1    Sep. 11, 2014

(30) Foreign Application Priority Data

Mar. 6, 2013  (JP) .................. 2013-044244

(51) Int. Cl.
| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B64D 31/06* | (2006.01) | |
| *B64D 27/24* | (2006.01) | |
| *H02P 23/00* | (2006.01) | |

(52) U.S. Cl.
CPC ................ *B64D 31/06* (2013.01); *B64D 27/24* (2013.01); *H02P 23/00* (2013.01); *Y02T 50/62* (2013.01)

(58) Field of Classification Search
CPC ............................... B64D 31/06; B64D 27/24
USPC ............................................................ 701/3
See application file for complete search history.

(56) References Cited

U.S. PATENT DOCUMENTS 6,986,688 B1    1/2006    Jansen

*Primary Examiner* — Maceeh Anwari
(74) *Attorney, Agent, or Firm* — Westerman, Hattori, Daniels & Adrian, LLP

(57) ABSTRACT

The present invention provides an electric propulsion system control apparatus that uses electric means alone so that effects pertaining to weight and cost are suppressed, is capable of accurate detection even when an airspeed has a binary relationship with a torque and a rotation speed of a propeller, and thereby exhibits improved detection precision and responsiveness. The electric propulsion system control apparatus drives a propulsion propeller to rotate, and is configured to estimate the airspeed from a data set stored in advance in relation to the airspeed and a propeller characteristic, and a plurality of torque and rotation speed estimation values detected under different driving conditions.

5 Claims, 17 Drawing Sheets

Related Art

Related Art

ELECTRIC PROPULSION SYSTEM CONTROL APPARATUS

BACKGROUND OF THE INVENTION

1. Field of the Invention

The present invention relates to an electric propulsion system control apparatus having an electric drive motor that drives a propulsion propeller to rotate, current detecting means for detecting a current of the electric drive motor, rotation speed detecting means for detecting a rotation speed of the electric drive motor, and drive control means for controlling the electric drive motor, and more particularly to an electric propulsion system control apparatus suitable for drive-controlling a propulsion propeller of an aircraft.

2. Description of the Related Art

To fly an aircraft safely and efficiently, it is important to monitor an airspeed and an atmospheric density during flight.

In an aircraft, the airspeed is typically detected by detecting a dynamic pressure that is proportional to a square of the airspeed using a pressure gauge connected by a pipe to a Pitot tube.

In this method, a maximum delay of approximately several seconds may occur before dynamic pressure variation occurring at a tip end of the Pitot tube propagates through the pipe so as to reach the pressure gauge and be detected as airspeed variation, and therefore this method is problematic when applied to a case in which the airspeed varies over time.

To maintain efficiency in a propulsion system of the aircraft, and thereby stabilize an attitude and an altitude of an airframe, operating conditions of the propulsion system such as a rotation speed and a pitch angle of a propeller must be adjusted in accordance with the airspeed.

However, when airspeed detecting means employing the aforementioned Pitot tube is used in cases where the airspeed varies over time, such as during a takeoff run or in gusty conditions, airspeed detection and operating condition adjustment cannot be performed in a timely fashion relative to the airspeed variation, leading to a reduction in efficiency, and as a result, problems such as an increased takeoff run length and a large loss of altitude may occur.

Highly responsive airspeed detecting means such as a hot wire anemometer also exists, but demerits pertaining to cost, weight, and so on are unavoidable when such means is installed in an aircraft.

SUMMARY OF THE INVENTION

In a conventional method applied to a watercraft, on the other hand, a fluid velocity is detected at low cost and with no weight penalty using a set of data relating to a torque and a rotation speed, which are estimated from a motor current used to drive a propulsion propeller, and the fluid velocity (see U.S. Pat. No. 6,986,688).

In this conventional method, only electric means, and not poorly responsive means such as a Pitot tube, is used, and therefore detection is performed at high speed. In an aircraft propulsion propeller, however, the atmospheric density varies in accordance with variation in the altitude, and therefore atmospheric density detecting means must be provided separately.

Further, in an aircraft propulsion propeller, the airspeed has a binary relationship with the torque and the rotation speed of the propeller, and therefore the airspeed cannot be detected accurately simply from a single combination of a rotation speed and a torque.

FIG. 2 is a block diagram showing an electric propulsion system control apparatus 500 using a conventional Pitot tube, wherein an aircraft is propelled by a propulsion propeller 501, and the propulsion propeller 501 is driven by an electric drive motor 502, which is controlled by drive control means 503, using power supplied from a power supply 504.

An airspeed U is detected by airspeed detecting means constituted by a Pitot tube 509, a pressure pipe, and a pressure gauge 510. However, a maximum of approximately several seconds is required for the dynamic pressure to be transmitted from the Pitot tube 509 to the pressure gauge 510 through the pressure pipe so as to be detected as variation in the airspeed U, and moreover, separate atmospheric density detecting means 511 must be provided to detect the atmospheric density.

When the conventional method described in U.S. Pat. No. 6,986,688 is applied to a propulsion propeller of an aircraft, the aircraft still requires atmospheric density detecting means, and moreover, according to a characteristic of the aircraft propulsion propeller, as shown in FIG. 3, in a relationship between the airspeed U and a combination of a torque $\tau$ and a rotation speed N, the torque $\tau$ has a binary property relative to the airspeed U, and therefore the airspeed U cannot be detected simply by detecting single values of the torque $\tau$ and the rotation speed N.

For example, in a propulsion propeller having the characteristic shown in FIG. 3, when a rotation speed value $N=N_3$ rpm and a torque value $\tau=\tau_a$ Nm are detected, the estimated airspeed U takes one of two values, i.e. either $U_{a1}$ m/s or $U_{a2}$ m/s, and therefore the airspeed U cannot be specified.

Hence, the present inventor solved the problem of this binary property while also enabling atmospheric density detection by detecting a plurality of torque and rotation speed values under different driving conditions in accordance with the responsiveness of an electric drive motor, and in so doing arrived at a completely new concept not available in the related art.

More specifically, an object of the present invention is to provide an electric propulsion system control apparatus that uses electric means alone so that effects pertaining to weight and cost are suppressed, is capable of accurate detection even when an airspeed has a binary relationship with a torque and a rotation speed of a propeller, and thereby exhibits improved detection precision and responsiveness.

FIG. 1 is a block diagram showing an electric propulsion system control apparatus 100 according to the present invention, wherein, similarly to the conventional example described above, an aircraft is propelled by a propulsion propeller 101, and the propulsion propeller 101 is driven by an electric drive motor 102, which is controlled by drive control means 103, using power supplied from a power supply 104.

In the present invention, values of the torque $\tau$ and the rotation speed N can be detected within a short period by having current detecting means 105 and voltage detecting means 106 detect a voltage and a current, and therefore a plurality of values of the torque $\tau$ and the rotation speed N can be obtained under different driving conditions in an extremely short time. Accordingly, one of two values of a characteristic having a binary property can be estimated accurately, and as a result, the airspeed U is estimated accurately using only electric means, i.e. without the use of a Pitot tube or the like.

In addition, the atmospheric density is estimated accurately using only electric means on the basis of the plurality of values of the torque $\tau$ and the rotation speed N.

As regards the rotation speed N, various small, lightweight detecting means using an optical sensor, a magnetic sensor, or the like are available, and therefore the rotation speed N may be detected using separate rotation speed detecting means independently of the voltage detecting means.

More specifically, the present invention solves the problems described above by providing an electric propulsion system control apparatus having an electric drive motor that drives a propulsion propeller to rotate, current detecting means for detecting a current of the electric drive motor, rotation speed detecting means for detecting a rotation speed of the electric drive motor, and drive control means for controlling the electric drive motor, wherein the drive control means includes: a driving force calculation unit that estimates a torque of the electric drive motor from the current detected by the current detecting means; a condition calculation unit that estimates an airspeed; and a thrust control unit that varies one or both of the torque and the rotation speed of the electric drive motor, and the condition calculation unit is configured to estimate the airspeed from a data set stored in advance in relation to the airspeed and a propeller characteristic, and a plurality of torque and rotation speed estimation values detected under different driving conditions.

In the electric propulsion system control apparatus according to the present invention, the condition calculation unit is configured to estimate the airspeed from the data set stored in advance in relation to the airspeed and the propeller characteristic, and the plurality of torque and rotation speed estimation values detected under different driving conditions, and therefore the airspeed can be detected using electric means alone. As a result, effects pertaining to weight and cost are suppressed, and improvements in detection precision and responsiveness are achieved.

In an aircraft in particular, even when the airspeed varies over time such as during a takeoff run or in gusty conditions, airspeed detection and operating condition adjustment can be performed quickly and in a timely and accurate fashion relative to the variation in the airspeed. Furthermore, operating conditions of the propulsion system such as the rotation speed and the pitch angle of the propeller can be adjusted to optimal values with a high degree of responsiveness, whereby efficiency is maintained in the propulsion system and the attitude and altitude of the airframe are stabilized. As a result, an increase in the takeoff run length and a large loss of altitude are prevented, leading to an improvement in safety.

According to the configuration described in claim 2, the condition calculation unit is configured to estimate the atmospheric density and the airspeed, and therefore the airspeed can be detected accurately even when the propeller characteristic varies in accordance with the atmospheric density.

Further, even when optimum operating conditions vary according to the altitude, the altitude can be estimated by detecting the atmospheric density, and therefore the operating conditions of the propulsion system, such as the rotation speed and the pitch angle of the propeller, can be adjusted to optimal values with a high degree of responsiveness.

According to the configuration described in claim 3, the condition calculation unit has a detection control function for causing the thrust control unit to vary one or both of the torque and the rotation speed of the electric drive motor for a short time. Hence, combinations of torque and rotation speed values can be detected by activating the detection control function intermittently at desired timings, and as a result, the airspeed and the atmospheric density can be detected in accordance with the operating conditions while suppressing an effect of rotation speed variation on a motion of the airframe.

According to the configuration described in claim 4, the thrust control unit is configured to be capable of controlling both the electric drive motor and the variable pitch mechanism independently, and therefore the operating conditions of the propulsion system can be adjusted to optimal values with an even higher degree of responsiveness.

According to the configuration described in claim 5, the thrust control unit has an efficiency maximization function for varying one or both of the electric drive motor and the variable pitch mechanism in accordance with the estimated atmospheric density and airspeed so as to maximize an efficiency of the propeller. Therefore, even when the airspeed varies unexpectedly due to a gust of wind or the like during the takeoff run of the aircraft, a reduction in efficiency is prevented and an increase in the takeoff run length is suppressed. As a result, the danger of overrun is reduced, leading to an improvement in safety.

According to the configuration described in claim 6, the thrust control unit has a speed maintenance function for varying one or both of the electric drive motor and the variable pitch mechanism in accordance with the estimated atmospheric density and airspeed so as to maintain the airspeed. Therefore, loss of altitude is suppressed even when the airspeed varies unexpectedly due to a gust of wind or the like while the aircraft is in flight, and as a result, safety is improved.

According to the configuration described in claim 7, the thrust control unit is configured to be capable of switching between the efficiency maximization function and the speed maintenance function in accordance with the estimated atmospheric density, and therefore optimum control can be performed in accordance with the altitude of the aircraft, leading to a further improvement in safety.

DESCRIPTION OF THE PREFERRED EMBODIMENTS

An electric propulsion system control apparatus according to the present invention includes: an electric drive motor that drives a propulsion propeller to rotate, current detecting means for detecting a current of the electric drive motor, rotation speed detecting means for detecting a rotation speed of the electric drive motor, and drive control means for controlling the electric drive motor, wherein the drive control means includes: a driving force calculation unit that estimates a torque of the electric drive motor from the current detected by the current detecting means; a condition calculation unit that estimates an airspeed; and a thrust control unit that varies one or both of the torque and the rotation speed of the electric drive motor, and the condition calculation unit is configured to estimate the airspeed from a data set stored in advance in relation to the airspeed and a propeller characteristic, and a plurality of torque and rotation speed estimation values detected under different driving conditions. As long as the electric propulsion system control apparatus according to the present invention uses electric means alone so that effects pertaining to weight and cost are suppressed, is capable of accurate detection even when the airspeed has a binary relationship with the torque and the rotation speed of the propeller, and thereby exhibits improved detection precision and responsiveness, there are no limitations on specific embodiments thereof.

The electric propulsion system control apparatus according to the present invention is preferably applied to an aircraft, but may also be applied to a watercraft or an overland wind-propelled moving body.

Further, the present invention may be applied to a configuration in which the propulsion propeller is a wind turbine such as a wind turbine generator and the electric drive motor is normally used as a power generator.

(First Embodiment)

Figure 1:
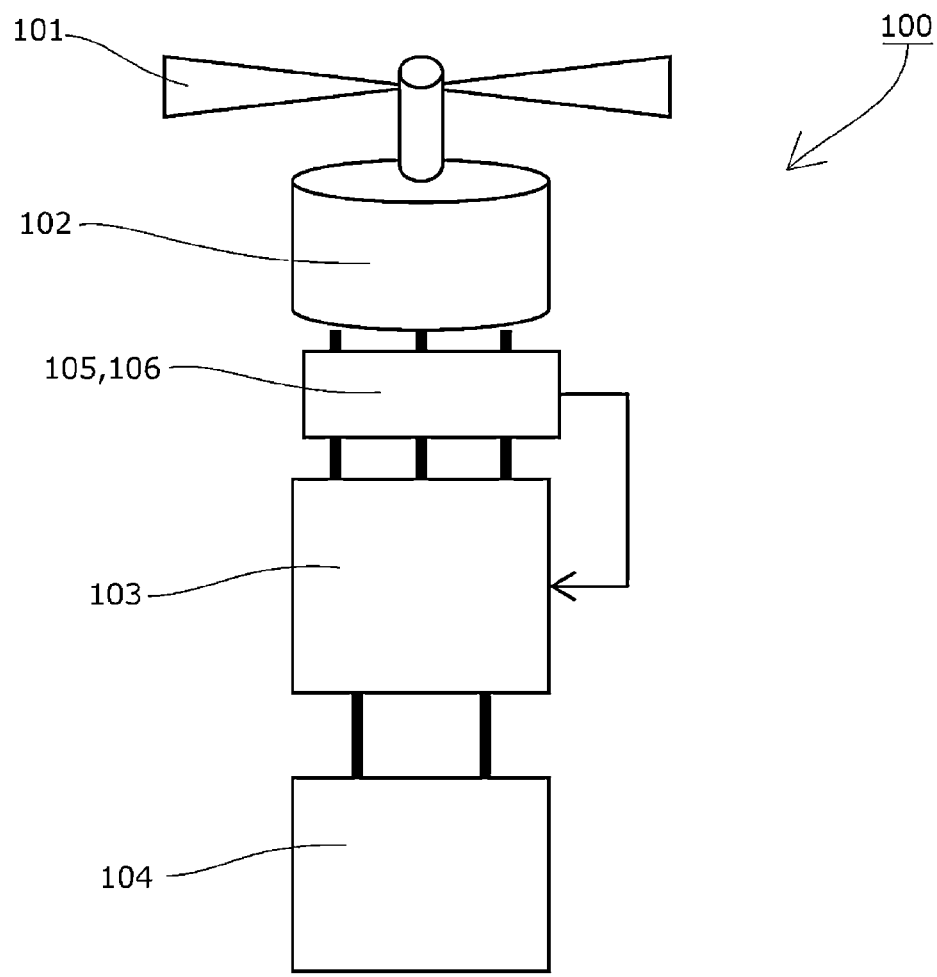
FIG. 1 is a block diagram of an electric propulsion system control apparatus according to the present invention.
Figure 2:
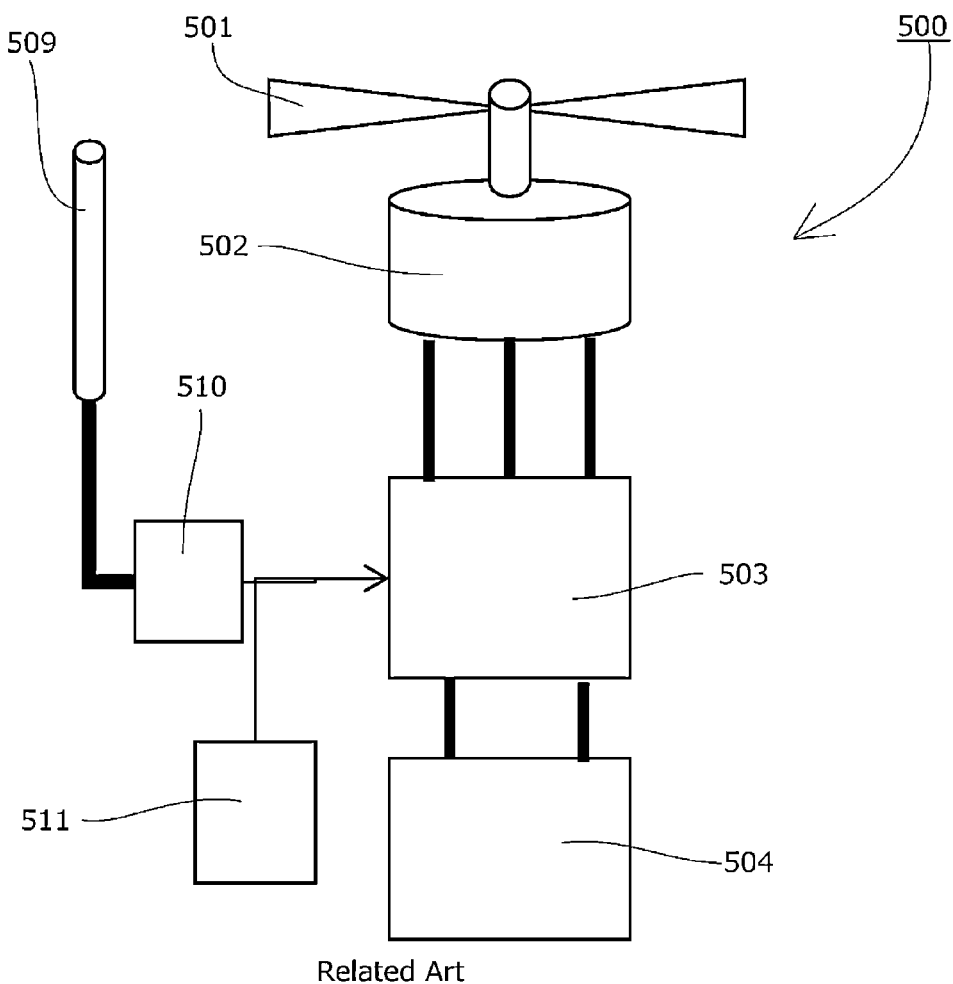
FIG. 2 is a block diagram showing an electric propulsion system control apparatus employing a conventional Pitot tube.
Figure 3:
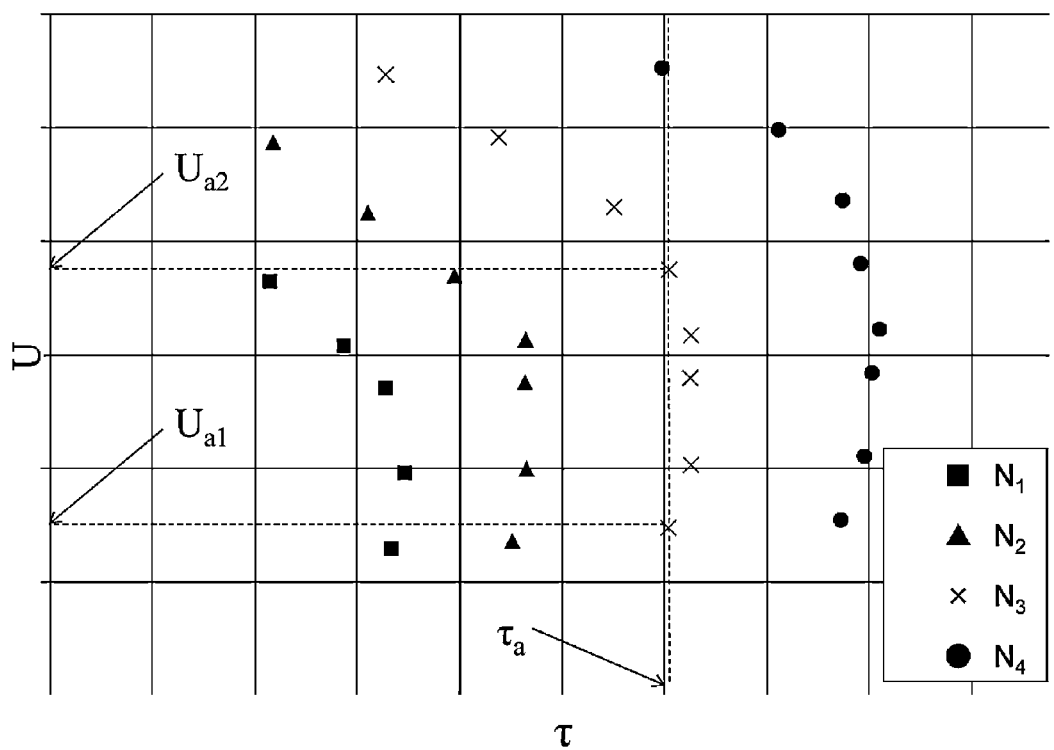
FIG. 3 is a graph showing a characteristic of an aircraft propulsion propeller.

The electric propulsion system control apparatus 100 according to the present invention will now be described in further detail on the basis of FIG. 1.

Figure 4:
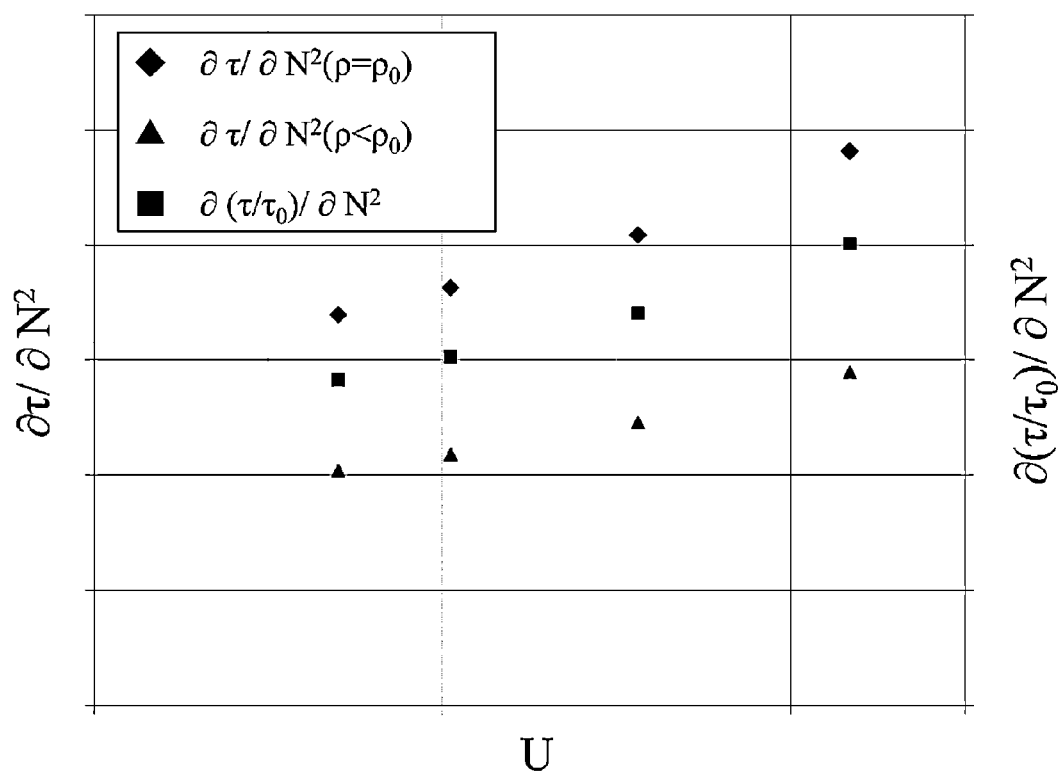
FIG. 4 is a graph showing a set of data relating to an airspeed U, a torque $\tau$ and a rotation speed N of a propulsion propeller 101, and an atmospheric density $\rho$.
Figure 5:
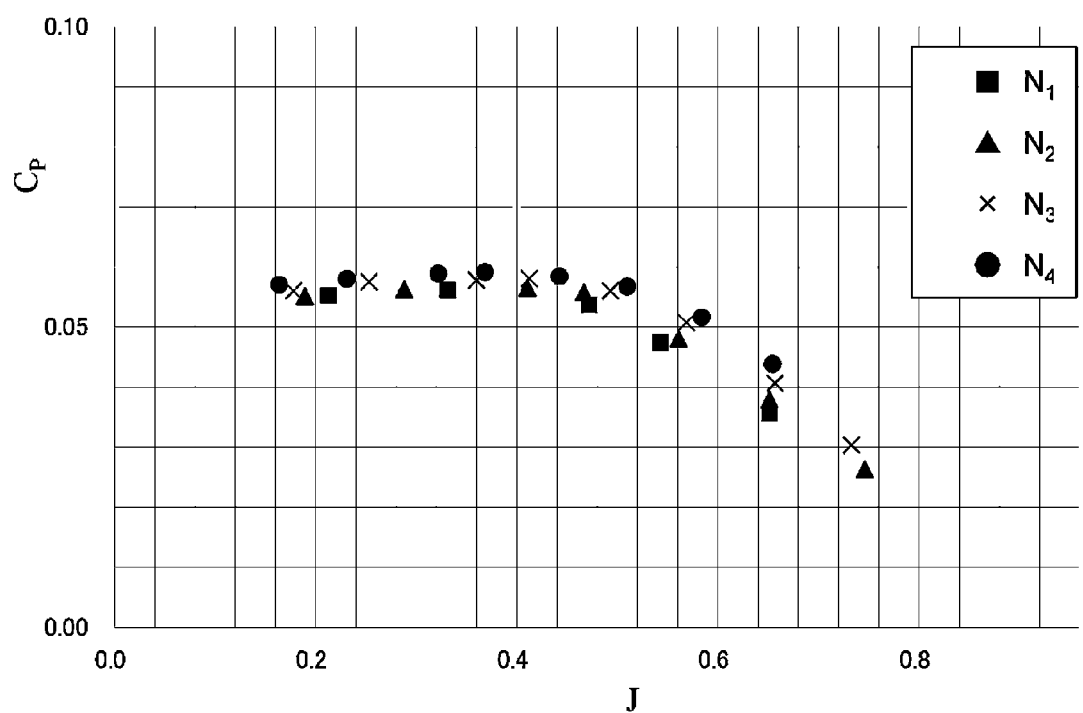
FIG. 5 is a graph showing a set of data relating to an advance ratio J of the propeller, a propeller power coefficient $C_P$, and the rotation speed N.

The drive control means 103 includes a data set relating to the airspeed U, the torque $\tau$ and the rotation speed N of the propulsion propeller 101, and the atmospheric density $\rho$, such as those shown in FIGS. 4 and 5, and has a function for estimating the torque $\tau$ generated by the electric drive motor 102 from a current I supplied to the electric drive motor 102, which is obtained from the current detecting means 105, and a function (rotation speed detecting means) for estimating the rotation speed N from a voltage E applied to the electric drive motor 102, which is obtained from the voltage detecting means 106.

The drive control means 103 is capable of estimating the torque $\tau$ and the rotation speed N from the supplied current I and the applied voltage E obtained successively from the current detecting means 105 and the voltage detecting means 106, respectively, and detecting the airspeed U and the atmospheric density $\rho$ using a sequence to be described below.

Figure 6:
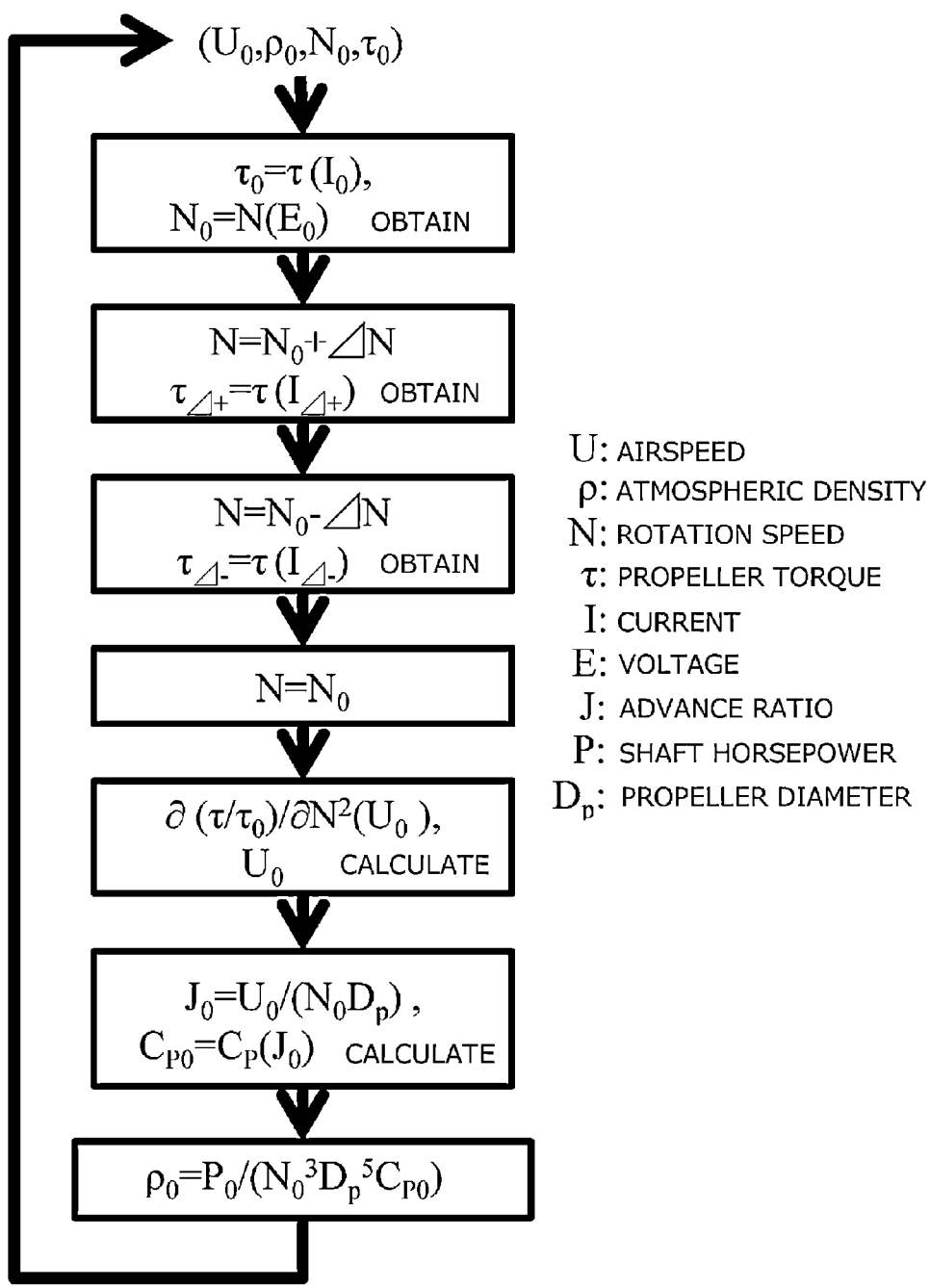
FIG. 6 is a sequence diagram showing detection of the airspeed U and the atmospheric density $\rho$ according to a first embodiment of the present invention.

In the detection sequence of the airspeed U and the atmospheric density $\rho$, when the aircraft is flying at ($U_0$, $\rho_0$, $N_0$, $\tau_0$), as shown in FIG. 6, first, the drive control means 103 estimates $N_0$, $\tau_0$ from $E_0$, $I_0$.

Since a thrust T of the propeller is normally determined from flight conditions of the aircraft and the rotation speed N cannot be modified freely in order to detect the airspeed U and the atmospheric density $\rho$, the rotation speed N is varied minutely ($\Delta N$) within a sufficiently small duration relative to an acceleration/deceleration response of the airframe such that an average value of the thrust T is maintained, whereupon the torque $\tau$ at each rotation speed N is estimated from the supplied current I and a propeller inertia.

Figure 7:
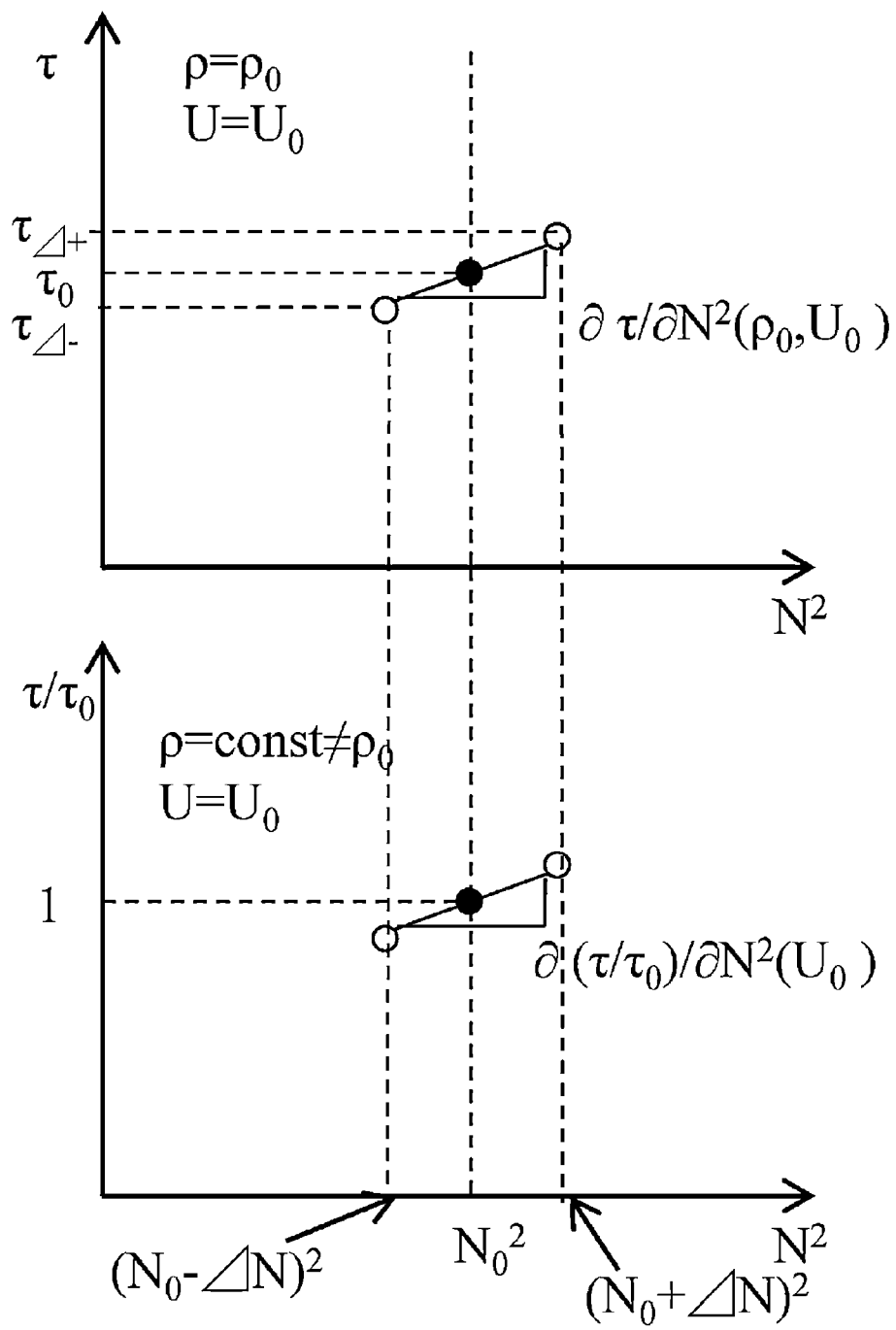
FIG. 7 is an illustrative view showing detection of the atmospheric density $\rho$.

After returning the rotation speed to $N_0$, $\delta(\tau/\tau_0)/\delta N^2$ is calculated from a value obtained by dividing the torque $\tau$ by $\tau_0$, as shown in FIG. 7.

At this time, as shown in FIG. 4, $\delta\tau/\delta N^2$ is typically a function of both the airspeed U and the atmospheric density $\rho$. However, $\delta(\tau/\tau_0)/\delta N^2$ is a function of only the airspeed U, and therefore, using $\delta(\tau/\tau_0)/\delta N^2$, $U_0$ can be calculated without the need for separate atmospheric density detecting means.

An advance ratio $J_0$ of the propeller is calculated from the calculated $U_0$ using a relationship shown below in Equation (1), whereupon $C_P$ is calculated from $J_0$ and the relationship shown in FIG. 5.

[Equation 1]

$$J = \frac{U}{ND_P} \quad (1)$$

($D_P$: propeller diameter)

$\rho_0$ is then calculated from the obtained $C_P$ ($J_0$) using a relationship shown below in Equation (2).

[Equation 2]

$$C_P = \frac{P}{\rho N^3 D_P^5} \quad (2)$$

As a result, it is possible to detect the airspeed U and the atmospheric density $\rho$, which could not be detected using the conventional method, and therefore increases in responsiveness and detection precision can be achieved over the conventional method without incurring penalties in terms of weight and cost by detecting the airspeed U and the atmospheric density ρ from parameters of the electrified propulsion system.

[Second Embodiment]

An electric propulsion system control apparatus having a speed maintenance function, serving as another embodiment of the present invention, will now be described.

Figure 8:
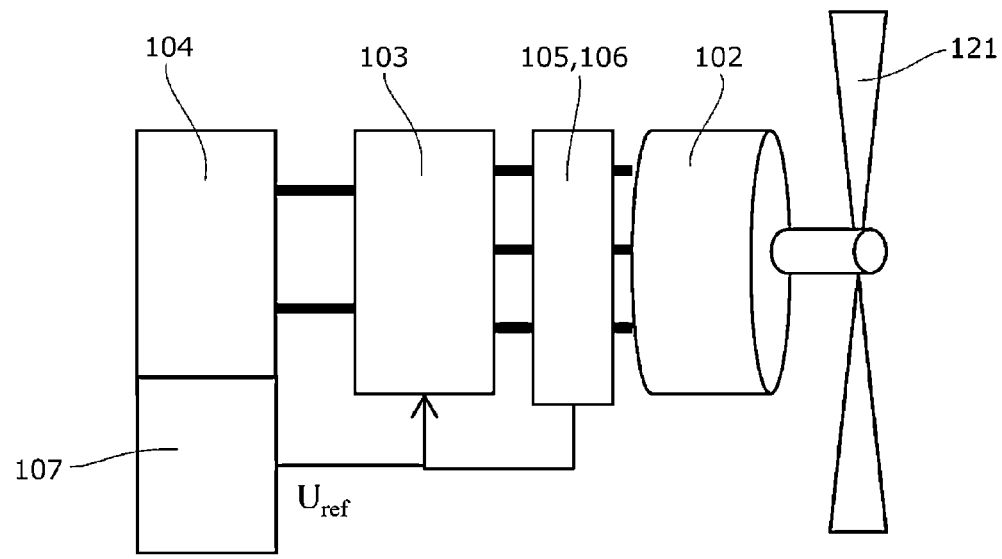
FIG. 8 is a block diagram showing an electric propulsion system control apparatus that employs a fixed pitch propeller and has a speed maintenance function, according to the first embodiment of the present invention.
Figure 9:
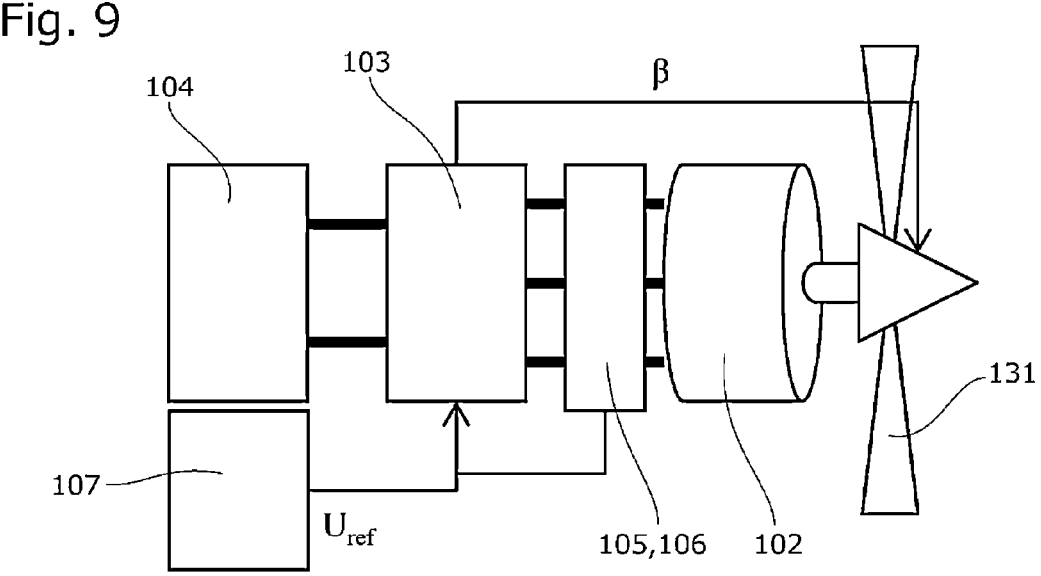
FIG. 9 is a block diagram showing an electric propulsion system control apparatus that employs a variable pitch propeller and has a speed maintenance function, according to the first embodiment of the present invention.

FIG. 8 shows a configuration in which a fixed pitch propeller 121 is employed as the propulsion propeller, and FIG. 9 shows a configuration in which a variable pitch propeller 131 is employed as the propulsion propeller.

The fixed pitch propeller 121 or the variable pitch propeller 131 is driven by the electric drive motor 102, which is controlled by the drive control means 103.

Figure 10:
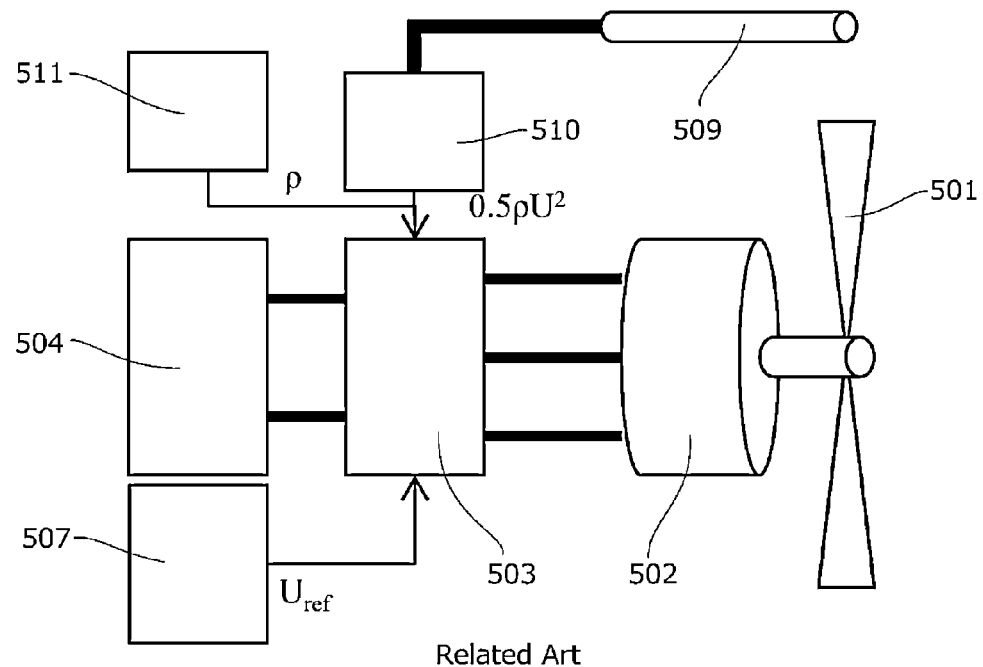
FIG. 10 is a block diagram showing an electric propulsion system control apparatus that employs a conventional Pitot tube and has a speed maintenance function.
Figure 11:
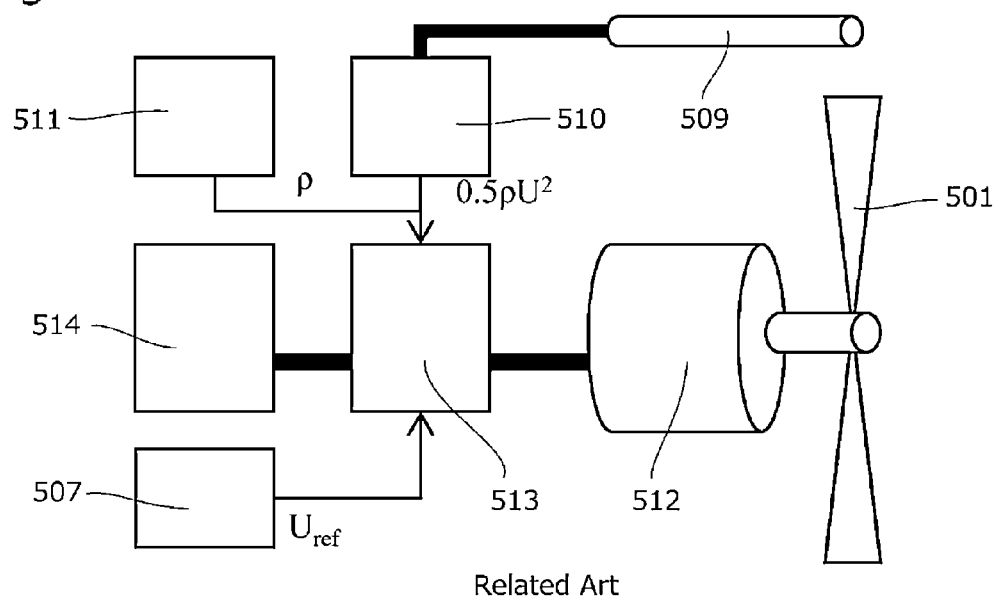
FIG. 11 is a block diagram showing an internal combustion engine propulsion system control apparatus that employs a conventional Pitot tube and has a speed maintenance function.

Further, for comparison, FIG. 10 shows a configuration employing airspeed detecting means constituted by the conventional Pitot tube 509, pressure pipe, pressure gauge 510, and so on, while FIG. 11 shows a configuration in which the propulsion propeller 501 is driven by an internal combustion engine 512, which is controlled by engine control means 513, using fuel supplied from a conventional fuel tank 514.

Figure 12:
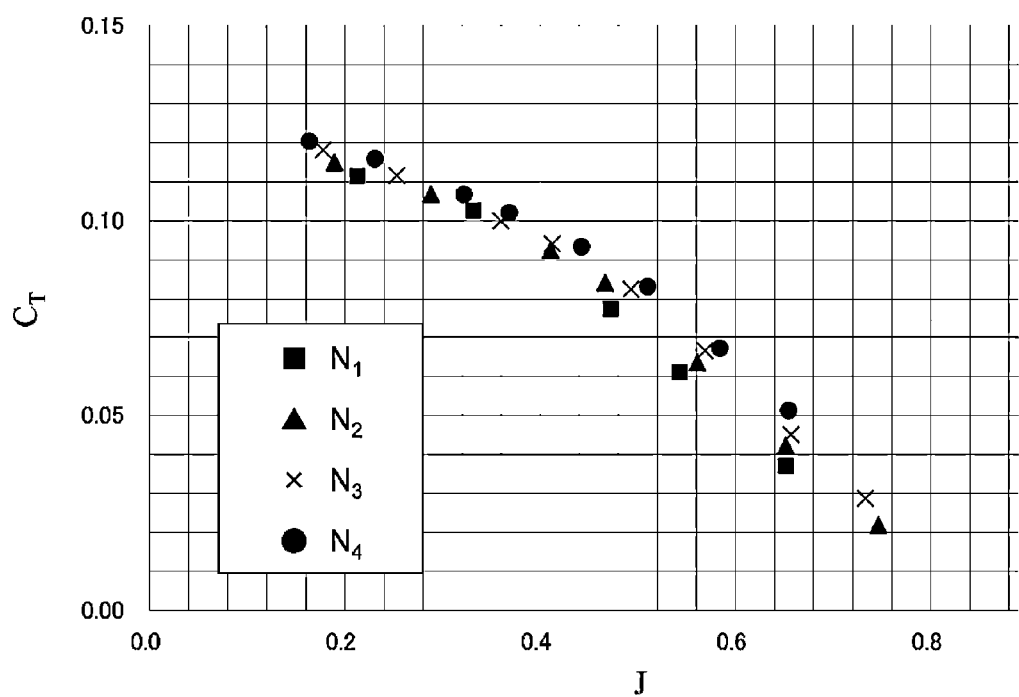
FIG. 12 is a graph showing a set of data relating to a propeller thrust T, the airspeed U, the rotation speed N, the atmospheric density $\rho$, and the advance ratio J of the propeller.

In all embodiments and reference examples, the drive control means 103, 503 and the engine control means 513 have a function for detecting the airspeed U and the atmospheric density ρ using the method described above, include a data set relating to relationships between the propeller thrust T, the airspeed U, the rotation speed N, and the atmospheric density ρ, such as that shown in FIG. 12, and have a function for increasing the propeller thrust T in accordance with Equation (3) shown below using the data set when the detected airspeed U is lower than an indicated airspeed value $U_{ref}$ input from an airspeed indication unit 107, 507, and reducing the propeller thrust T when the detected airspeed U is higher than the indicated airspeed value $U_{ref}$.

[Equation 3]

$$C_T = \frac{T}{\rho N^2 D_p^4} \qquad (3)$$

When a following gust of wind acts on an aircraft in flight, the airspeed U decreases, and as a result, the airframe begins to descend.

If the airspeed U is not restored at this time, the aircraft may stall or crash, and it is therefore necessary to detect the gust of wind and restore the airspeed U quickly.

With the configuration having the conventional Pitot tube 509 shown in FIGS. 10 and 11, a maximum of approximately several seconds may be required for the dynamic pressure to be transmitted from the Pitot tube 509 to the pressure gauge 510 through the pressure pipe so as to be detected as variation in the airspeed U.

In this embodiment of the present invention, shown in FIGS. 8 and 9, on the other hand, variation in the airspeed U is detected from the propulsion system parameters without using a pipe, and therefore the time required for detection is extremely short. As a result, a gust of wind can be detected extremely quickly.

Figure 13:
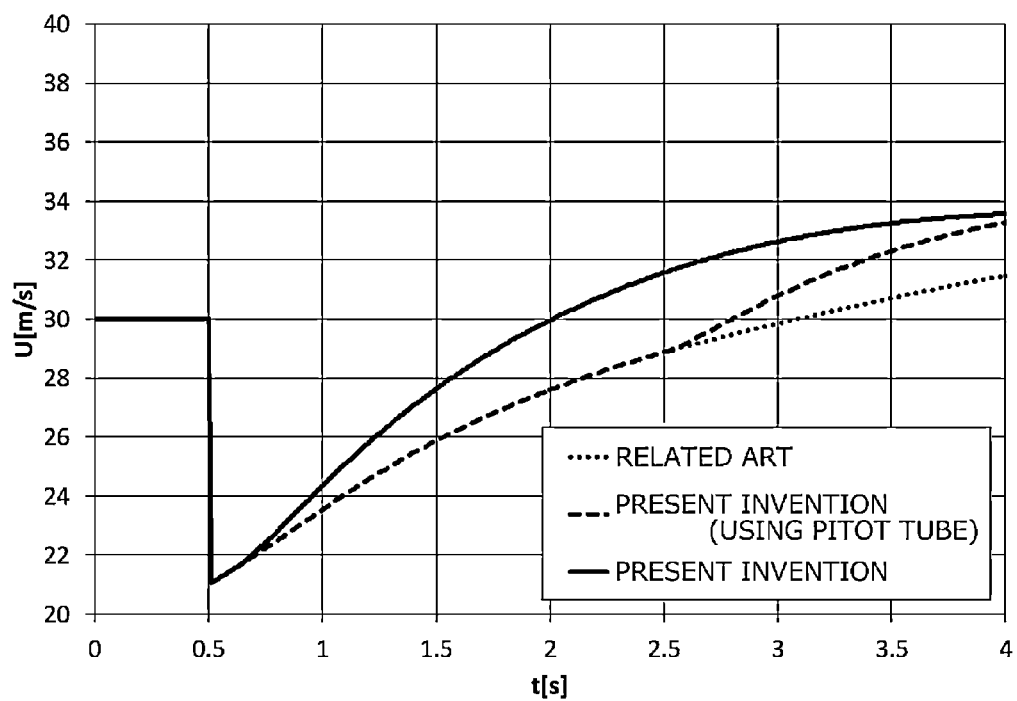
FIG. 13 is a comparison graph showing temporal variation in the airspeed U of a small four-seater aircraft when a following gust of wind blows.
Figure 14:
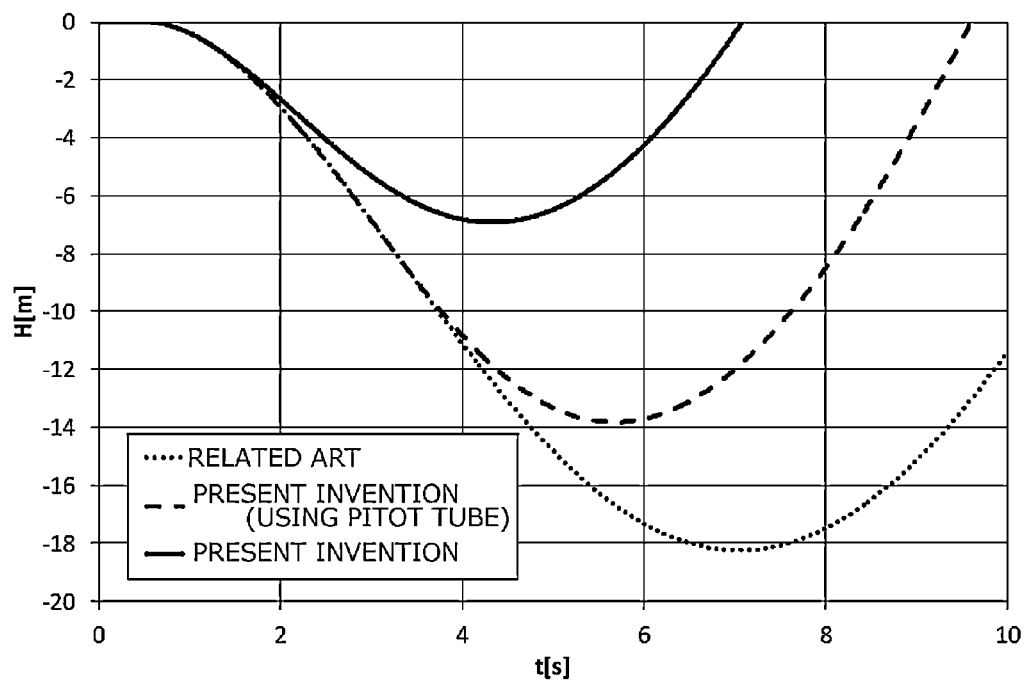
FIG. 14 is a comparison graph showing temporal variation in an altitude H of a four-seater small aircraft when a following gust of wind blows.

FIGS. 13 and 14 respectively show variation over time in the airspeed U and the altitude H of a small four-seater aircraft when a following gust of wind blows.

With the configuration shown in FIG. 10, the processes to detect the airspeed U and start increasing the propeller thrust T are delayed, as described above, and therefore restoration of the airspeed U is also delayed. As a result, the altitude H decreases to a similar degree to that of the related art shown in FIG. 11.

With this embodiment of the present invention, shown in FIGS. 8 and 9, on the other hand, the airspeed U is restored earlier than when a gust of wind is detected and the airspeed U is restored in accordance with the related art shown in FIGS. 10 and 11, and as a result, the reduction in the altitude H can be suppressed to half or less. Hence, both speed detection and thrust control can be performed at high speed, and therefore a special effect is exhibited in terms of restoring the airspeed U and suppressing loss of the altitude H.

[Third Embodiment]

An electric propulsion system control apparatus having an efficiency maximization function, which serves as a further embodiment of the present invention, will now be described.

Figure 15:
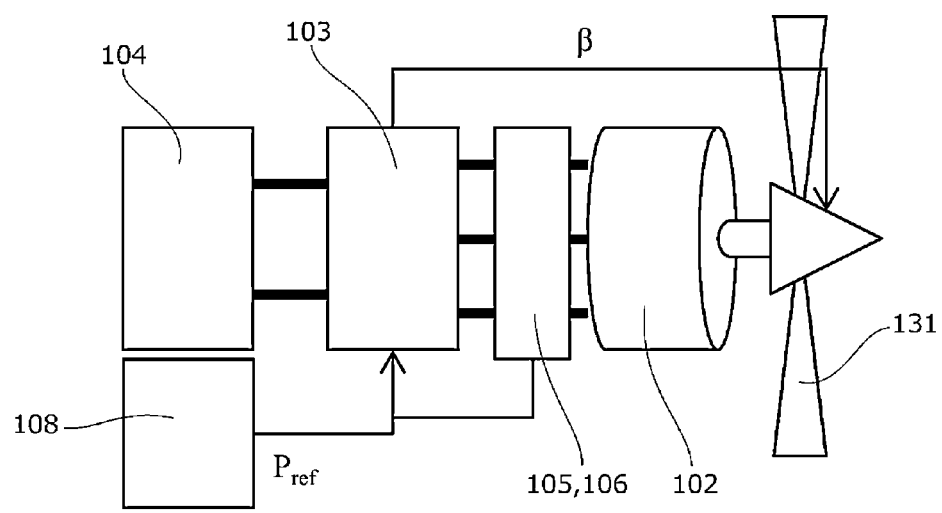
FIG. 15 is a block diagram showing an electric propulsion system control apparatus that employs a variable pitch propeller and has an efficiency maximization function, according to the first embodiment of the present invention.

FIG. 15 shows a similar configuration to FIG. 9, i.e. a configuration in which the variable pitch propeller 131 is employed as the propulsion propeller.

The variable pitch propeller 131 is driven by the electric drive motor 102, which is controlled by the drive control means 103.

Figure 16:
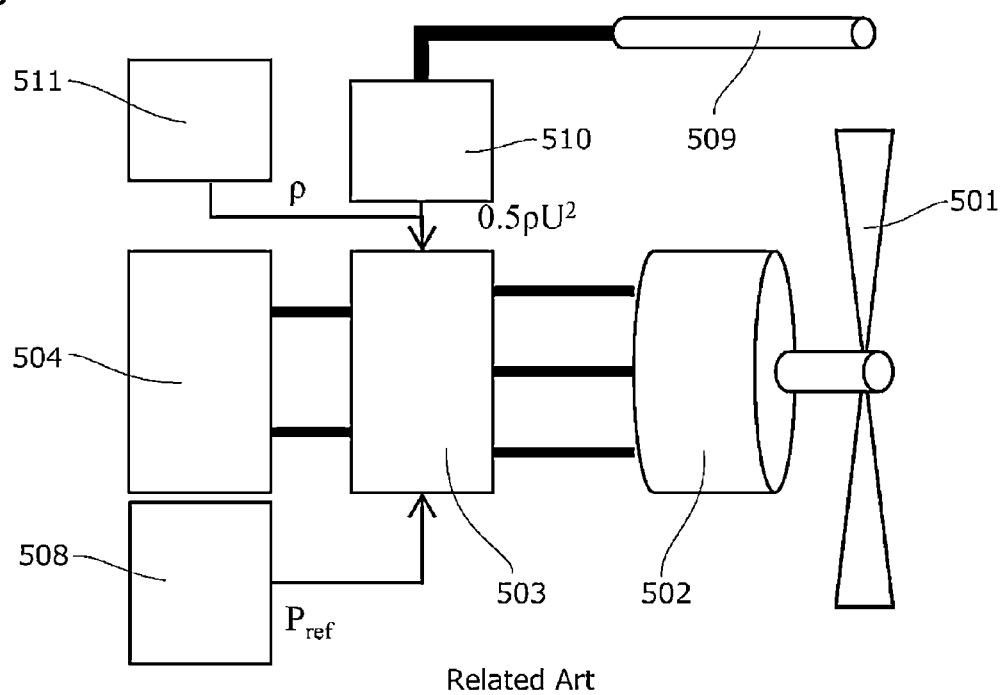
FIG. 16 is a block diagram showing an electric propulsion system control apparatus that employs a conventional Pitot tube and has an efficiency maximization function.

Further, for comparison, FIG. 16 shows a configuration employing airspeed detecting means constituted by the conventional Pitot tube 509, pressure pipe, pressure gauge 510, and so on.

Figure 17:
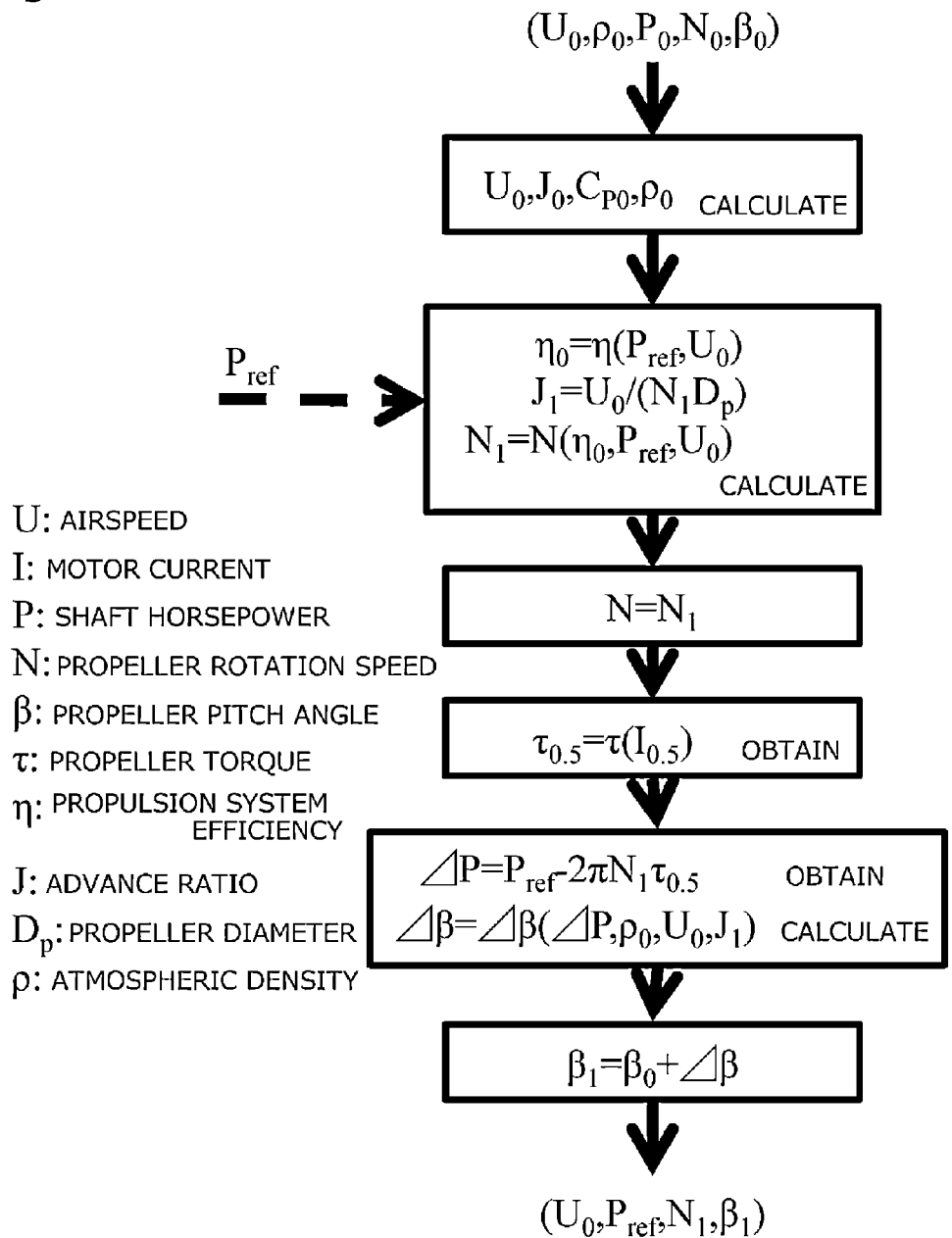
FIG. 17 is a sequence diagram showing propulsion system control according to the first embodiment of the present invention.

FIG. 17 shows a propulsion system control sequence of the drive control means 103.

Assuming that an initial condition (U, ρ, P, N, β) of the propulsion system is ($U_0$, $ρ_0$, $P_0$, $N_0$, $β_0$), the drive control means 103 detects $U_0$, $J_0$, $C_{P0}$, $ρ_0$ using the method described above.

Figure 18:
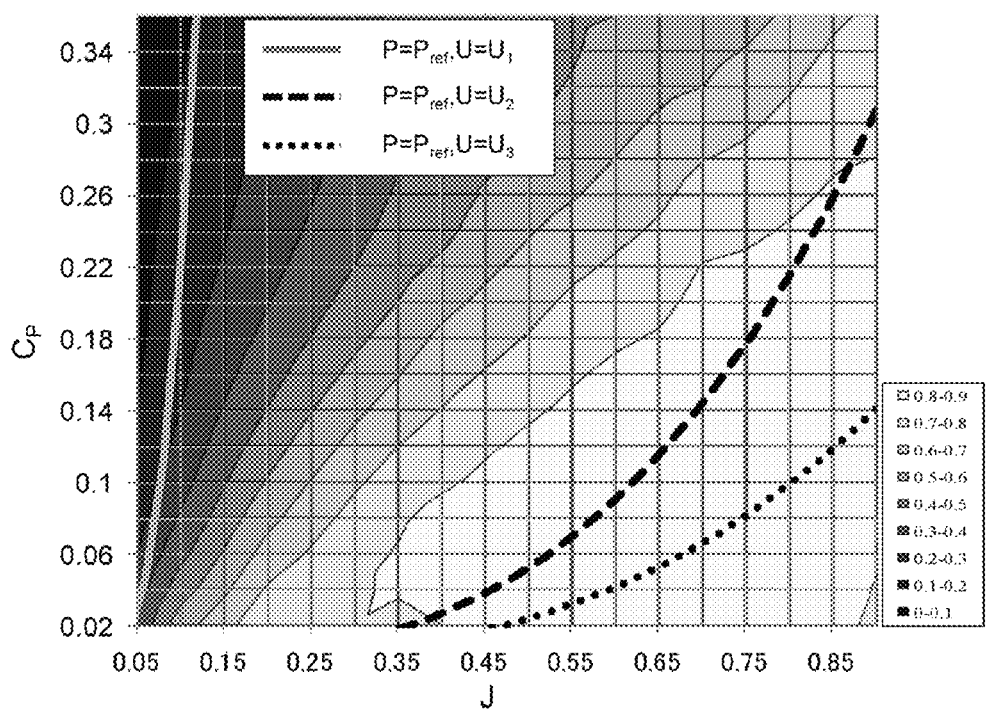
FIG. 18 is a graph showing a set of data relating to a propulsion system efficiency $\eta$, the advance ratio J, and the propeller power coefficient $C_P$.

Next, a value of $J_1$ for maximizing η and a new target value $N_1$ (=$U_0/(J_1 D_P)$) of the rotation speed N are calculated from a relationship between a propulsion system efficiency η, the advance ratio J, and a propeller power coefficient $C_P$, shown in FIG. 18, at indicated output values $P_{ref}$ and $U_0$ received from an output indication unit 108, 508.

The drive control means 103 maintains the rotation speed N at $N_1$ for a minute period of time during which variation in the airspeed U is negligible, and calculates a difference ΔP between a shaft horsepower at $N_1$ and $P_{ref}$ from a torque $τ_{0.5}$ estimated from a current $I_{0.5}$ at that time. The drive control means 103 then calculates a difference Δβ between a value $β_1$ that satisfies ($U_0$, $ρ_0$, $P_{ref}$, $N_1$, $β_1$) and a current pitch angle $β_0$ using Equation (5) shown below or a mathematical table, and increases the pitch angle of the variable pitch propeller 131 by Δβ. Thereafter, the drive control means 103 repeats the sequence described above following variation in the airspeed U and the atmospheric density ρ due to the motion of the airframe, and as a result, the propulsion system efficiency can be maximized at all times.

[Equation 4]

$$C_P = \frac{J^3 P}{\rho U^3 D_p^2} \qquad (4)$$

[Equation 5]

$$\Delta\beta = \frac{J_1^3 \Delta P}{\rho_0 U_0^3 D_p^2 (c_1 J_1 + c_2)} \qquad (5)$$

A case in which an airframe (a small four-seater aircraft) performs a takeoff run will now be described while comparing this embodiment with cases in which a detection method using the Pitot tube 509 shown in FIG. 16 is used and a conventional fixed speed propeller is applied.

Figure 19:
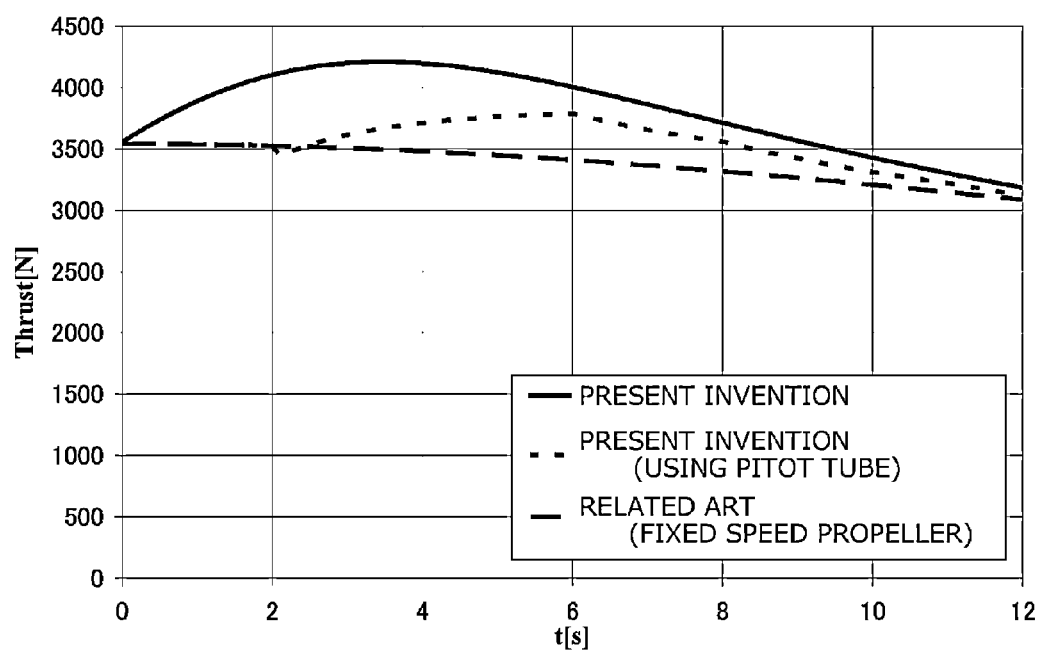
FIG. 19 is a comparison graph showing temporal variation in the propeller thrust T.
Figure 20:
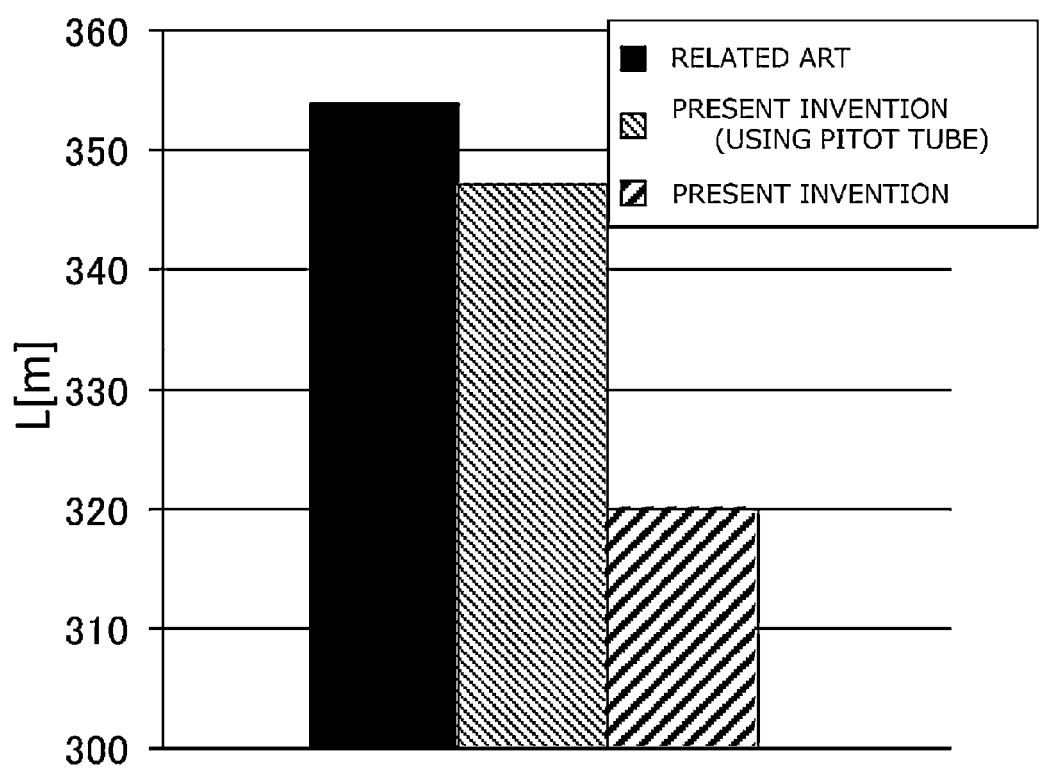
FIG. 20 is a comparison graph showing a takeoff run length L.

As shown in FIGS. 19 and 20, when only the conventional Pitot tube 509 is used to detect the airspeed, detection of the airspeed U, which increases over time, is delayed, making it impossible to adjust the rotation speed N and the pitch angle β in a timely fashion, and as a result, amounts by which the thrust can be increased and a takeoff run length L can be reduced remain limited.

According to this embodiment, however, the thrust during the takeoff run can be increased by a maximum of 20% in comparison with a case in which a conventional fixed speed propeller is applied, enabling a reduction of approximately 10% in the takeoff run length L, and since both speed detection and thrust control can be performed at high speed, a special effect can be obtained in terms of improving the takeoff performance.

According to the present invention, as described above, by employing only electric means, effects pertaining to weight and cost can be suppressed. Moreover, detection can be performed accurately even when the airspeed has a binary relationship with the torque and the rotation speed of the propeller. As a result, improvements in detection precision and responsiveness can be achieved.

In an aircraft in particular, an increase in the takeoff run length and a large loss of altitude are prevented, leading to an improvement in safety.

Furthermore, the electric propulsion system control apparatus according to the present invention may be applied to a watercraft or an overland wind-propelled moving body, and may also be applied to a configuration in which the propulsion propeller is a wind turbine or a water turbine and the electric drive motor is normally used as a wind-powered or water-powered power generator.

What is claimed is:

1. An electric propulsion system control apparatus comprising an electric drive motor that drives a propulsion propeller to rotate, a current detector for detecting a current of the electric drive motor, a rotation speed detector for detecting a rotation speed of the electric drive motor, and a processor for controlling the electric drive motor, the processor having:

a driving force calculation unit that estimates a torque of the electric drive motor from the current detected by the current detector;

a condition calculation unit that estimates an airspeed; and a thrust control unit that varies one or both of the torque and the rotation speed of the electric drive motor, and the condition calculation unit being configured to estimate the airspeed from a data set stored in advance in relation to the airspeed and a propeller characteristic, and a plurality of torque and rotation speed estimation values detected under different driving condition, wherein the condition calculation unit is configured to estimate an atmospheric density and the airspeed from a data set stored in advance in relation to the atmospheric density, the airspeed, and the propeller characteristic, and the plurality of torque and rotation speed estimation values detected under different driving conditions, and wherein the thrust control unit has an efficiency maximization function for varying one or both of the rotation speed of the electric drive motor and the pitch angle, which is varied using the variable pitch mechanism, in accordance with the estimated atmospheric density and airspeed so as to maximize an efficiency of the propeller.

2. The electric propulsion system control apparatus according to claim 1, wherein the condition calculation unit has a detection control function for causing the thrust control unit to vary one or both of the torque and the rotation speed of the electric drive motor for a short time, and uses values varied in accordance with the detection control function as the plurality of torque and rotation speed estimation values detected under different driving conditions.

3. The electric propulsion system control apparatus according to claim 1, wherein the propeller is configured such that a pitch angle thereof can be modified actively by a variable pitch mechanism, the thrust control unit is configured to be capable of controlling both the electric drive motor and the variable pitch mechanism independently, and the condition calculation unit has a detection control function for causing the thrust control unit to vary at least one of the torque and the rotation speed of the electric drive motor and the pitch angle for a short time, and uses values varied in accordance with the detection control function as the plurality of torque and rotation speed estimation values detected under different driving conditions.

4. The electric propulsion system control apparatus according to claim 1, wherein the thrust control unit has a speed maintenance function for varying one or both of the electric drive motor and the variable pitch mechanism in accordance with the estimated atmospheric density and airspeed so as to maintain the airspeed.

5. The electric propulsion system control apparatus according to claim 4, wherein the thrust control unit is configured to be capable of switching between the efficiency maximization function and the speed maintenance function in accordance with the estimated atmospheric density.

* * * * *